Sept. 8, 1953  G. A. R. HARTLEY ET AL  2,651,605
RECOVERY OF ACETIC ACID FROM AQUEOUS ACETIC ACID
SOLUTIONS BY EXTRACTIVE DISTILLATION
Filed Nov. 6, 1951

Inventors
George Anthony Rathbone Hartley
Charles Osburne Haughton
By their attorneys
Howson and Howson Patented Sept. 8, 1953

2,651,605

UNITED STATES PATENT OFFICE 2,651,605

RECOVERY OF ACETIC ACID FROM AQUEOUS ACETIC ACID SOLUTIONS BY EXTRACTIVE DISTILLATION

George A. R. Hartley and Charles O. Haughton, Coventry, England, assignors to Courtaulds Limited, London, England, a British company Application November 6, 1951, Serial No. 255,069
In Great Britain February 9, 1951

10 Claims. (Cl. 202—39.5)

This invention relates to the recovery of acetic acid from aqueous acetic acid solutions by extractive distillation.

In the specification of application, Serial No. 177,992 now abandoned, filed August 7, 1950, and its continuation-in-part application, Serial No. 255,068 of even date a process is described for the recovery of acetic acid from aqueous solutions of acetic acid which comprises adding a dimethoxy polyglycol, namely dimethoxytetraethylene glycol, dimethoxy triethylene glycol or dimethoxy diethylene glycol, to the solution, fractionally distilling from the mixture substantially all the water present and then recovering acetic acid, preferably by fractional distillation from the water-free or substantially water-free mixture of acetic acid and the dimethoxy polyglycol. This recovery process employs the principle of extractive distillation in which the dimethoxy polyglycols are used as extraction solvents.

It is the object of the present invention to provide an alternative class of extraction solvent.

According to the present invention a process for the recovery of acetic acid from aqueous solutions of acetic acid comprises adding to the solution a derivative of a polyglycol chosen from the group consisting of diethylene glycol, triethylene glycol in which each hydroxyl group is converted and which is chosen from the group consisting of (i) Methoxy triethylene glycol acetate
(CH$_3$.O.CH$_2$.CH$_2$.O.CH$_2$.CH$_2$.
O.CH$_2$.CH$_2$.O.CO.CH$_3$)

(ii) Diethylene glycol diacetate
(CH$_3$.CO.O.CH$_2$.CH$_2$.O.CH$_2$.CH$_2$.O.CO.CH$_3$)

(iii) Methoxy diethylene glycol acetate
(CH$_3$.CO.O.CH$_2$.CH$_2$.O.CH$_2$.CH$_2$.O.CH$_3$)
and (iv) Ethoxy triethylene glycol acetate
(C$_2$H$_5$.O.CH$_2$.CH$_2$.O.CH$_2$.CH$_2$.
O.CH$_2$.CH$_2$.O.CO.CH$_3$)

fractionally distilling from the mixture substantially all the water present and then recovering acetic acid, preferably by fractional distillation from the water-free or substantially water-free mixture of acetic acid and the polyglycol derivative. The molecular ratio of the polyglycol derivative as defined to the water present in aqueous acid solution is preferably within the range of from 1 to 5:1.

The polyglycol derivatives as defined are derivatives of diglycol or triglycol in which the hydroxyl groups have been converted into acetyl groups or into methoxy or ethoxy groups. They are particularly suitable for use as extraction solvents in the recovery of acetic acid because they are miscible in all proportions with and chemically inert to both water and acetic acid and do not form an azeotrope with either; they also have boiling points sufficiently higher than that of acetic acid, that is in the range of 160° to 280°, to permit separation of the acid and solvent by fractional distillation. Thus, methoxy triethylene glycol acetate boils at 244° centigrade, diethylene glycol diacetate at 247° centigrade, methoxy diethylene glycol acetate at 208° centigrade and ethoxy triethylene glycol acetate at approximately 260° centigrade. The solvents as defined also give a pronounced increase in the volatility of water with respect to the acid.

The process according to the invention is particularly applicable to the recovery of acetic acid from dilute aqueous solutions of acetic acid containing for example up to about 15 per cent of acetic acid where the usual azeotropic distillation processes are uneconomical. Distillation of the potassium acetate spinning bath liquors used in carrying out the process of application, Serial No. 122,832 yields distillates containing 10 to 11 per cent of acetic acid and such solutions are particularly suitable for rectification by the present invention.

The fractional distillation to recover acetic acid from the mixture of acetic acid and the extraction solvent is preferably but not necessarily effected under reduced pressure.

The process according to the invention may be carried out with a continuously operated apparatus as illustrated in the accompanying drawings. The apparatus shown in the drawing comprises a distillation column 1 heated by a boiler 2 which may be conveniently heated by steam under pressure. The mixture of acetic acid and water preferably in the vapour state is fed into the column 1 at an intermediate point by way of a pipe 3 and the extraction solvent according to the invention is simultaneously fed in near the top of the column 1 by way of a pipe 4. Heat is applied to the boiler 2, and steam driven off from the column 1 passes by way of a pipe 5 to a condenser 6 from which it may be withdrawn as desired by a waste pipe 7. At the same time the mixture of acetic acid and the extraction solvent collects in the boiler 2 and is passed by way of a pipe 8 to a second distillation column 9 heated by a boiler 10. In column 9 acetic acid together with a little water is distilled off and the vapour passes by way of a pipe 11 to a condenser 12 from which the condensate may be withdrawn to a receiver 15 for re-use by a pipe 13. The column 9 is preferably operated under reduced pressure by use of a vacuum pump 14.

The following examples using apparatus as described in the drawing illustrate the process of the present invention; parts and percentages are by weight:

*Example 1*

A 10 per cent aqueous acetic acid solution was passed through the pipe 3 into the column 1; the temperature of the boiler 2 was 130° centigrade and the temperature of the column 1 at the top was 100° centigrade. A mixture of 99.5 per cent of diethylene glycol diacetate and 0.5 per cent of acetic acid was supplied to the column 1 through the pipe 4 in a ratio of 1 part per part of aqueous acetic acid. Under these conditions a mixture of 99.8 per cent of water and 0.2 per cent of acetic acid collected in the condenser 6 and a mixture of 9.2 per cent of acetic acid, 1.4 per cent of water and 89.4 per cent of diethylene glycol diacetate was passed by way of pipe 8 into the second column 9. The boiler 10 was heated to a temperature of 160° centigrade and the temperature of the top of the column 9 was 35° centigrade; the pressure in the column 9 was maintained at 25 mm. of mercury by the vacuum pump 14. Under these conditions a mixture of 87 per cent of acetic acid and 13 per cent of water was condensed in the condenser 12 and a mixture of 99.5 per cent of diethylene glycol diacetate and 0.5 per cent of acetic acid collected in the boiler 10 and was returned by way of pipe 4 to the column 1 as described above.

*Examples 2 to 4*

The procedure described in Example 1 was repeated with like results, using the other extraction solvents according to the invention as follows:

*Example 2.*—Using methoxy diethylene glycol acetate, the temperature of the boiler 2 was 125° centigrade and the temperature of the boiler 10 was 208° centigrade, the boiler 10 being at atmospheric pressure.

*Example 3.*—Using ethoxy triethylene glycol acetate the temperature of the boiler 2 was 150° centigrade and the temperature of the boiler 10 which was at atmospheric pressure was 260° centigrade.

*Example 4.*—Using methoxy triethylene glycol acetate the temperature of the boiler 2 was 135° centigrade and the temperature of the boiler 10, which was at atmospheric pressure, was 244° centigrade,

What we claim is:

1. A process for the recovery of acetic acid from aqueous solutions of acetic acid comprising adding to the solution a compound which is a derivative of a polyglycol chosen from the group consisting of methoxy triethylene glycol acetate, diethylene glycol diacetate, methoxy diethylene glycol acetate and ethoxy triethylene glycol acetate, fractionally distilling from the mixture substantially all the water present and then recovering acetic acid from the resultant mixture of acetic acid and the polyglycol derivative.

2. A process for the recovery of acetic acid from aqueous solutions of acetic acid comprising adding to the solution a compound which is a derivative of a polyglycol chosen from the group consisting of methoxy diethylene glycol acetate, diethylene glycol diacetate, methoxy diethylene glycol acetate and ethoxy dietheylene glycol acetate, fractionally distilling from the mixture substantially all the water present and then fractionally distilling acetic acid from the resultant mixture of acetic acid and the polyglycol derivative.

3. A process for the recovery of acetic acid from aqueous solutions of acetic acid comprising adding to the solution a compound which is a derivative of a polyglycol chosen from the group consisting of methoxy triethylene glycol acetate, diethylene glycol diacetate, methoxy diethylene glycol acetate and ethoxy triethylene glycol acetate in an amount such that the molecular ratio of the polyglycol derivative to the water present in the solution is from 1 to 5:1, fractionally distilling from the mixture substantially all the water present and then fractionally distilling acetic acid from the resultant mixture of acetic acid and the polyglycol derivative.

4. A continuous process for the recovery of acetic acid from aqueous solutions of acetic acid which comprises feeding the aqueous acid solution and a compound which is a derivative of a polyglycol chosen from the group consisting of methoxy triethylene glycol acetate, diethylene glycol diacetate, methoxy diglycol acetate and ethoxy triethylene glycol acetate into a fractionating column, fractionally distilling substantially all the water from the mixture formed within the column, withdrawing the residue mixture of acetic acid and the polyglycol derivative from the fractionating column and passing it to a second fractionating column, fractionally distilling off acetic acid from the acetic acid-polyglycol derivative mixture in the second fractionating column and returning the residual polyglycol derivative to the first fractionating column.

5. A continuous process as claimed in claim 4 wherein the rates of feed of the aqueous acetic acid solution and of the polyglycol derivative are so adjusted that the molecular ratio of the polyglycol derivative to the water in the fractionating column is within the range of 1 to 5:1.

6. A continuous process as claimed in claim 4 wherein the second fractionating column is operated under reduced pressure.

7. A process for the recovery of acetic acid from aqueous solutions of acetic acid comprising adding to the solution methoxy triethylene glycol acetate, fractionally distilling from the mixture substantially all the water present and then recovering acetic acid from the resultant mixture of acetic acid and methoxy triethylene glycol acetate.

8. A process for the recovery of acetic acid from aqueous solutions of acetic acid comprising adding to the solution diethylene glycol diacetate, fractionally distilling from the mixture substantially all the water present and then recovering acetic acid from the resultant mixture of acetic acid and diethylene glycol diacetate.

9. A process for the recovery of acetic acid from aqueous solutions of acetic acid comprising adding to the solution methoxy diethylene glycol acetate, fractionally distilling from the mixture substantially all the water present and then recovering acetic acid from the resultant mixture of acetic acid and methoxy diethylene glycol acetate.

10. A process for the recovery of acetic acid from aqueous solutions of acetic acid comprising adding to the solution ethoxy triethylene glycol acetate, fractionally distilling from the mixture substantially all the water present and then recovering acetic acid from the resultant mixture of acetic acid and ethoxy triethylene glycol acetate.

G. A. R. HARTLEY.
C. O. HAUGHTON.

References Cited in the file of this patent

UNITED STATES PATENTS

| Number | Name | Date |
|---|---|---|
| 1,624,811 | Suida | Apr. 12, 1927 |
| 2,123,348 | Wentworth | July 12, 1938 |
| 2,339,160 | Dunn et al. | Jan. 11, 1944 |
| 2,350,256 | Shiras | May 30, 1944 |
| 2,357,344 | Norris et al. | Sept. 5, 1944 |
| 2,430,086 | Staff | Nov. 4, 1947 |
| 2,559,519 | Smith et al. | July 3, 1951 |
| 2,575,243 | Carlson et al. | Nov. 13, 1951 |

FOREIGN PATENTS

| Number | Country | Date |
|---|---|---|
| 560,169 | Great Britain | Mar. 23, 1944 |
| 563,164 | Great Britain | Aug. 1, 1944 |